United States Patent [19]
Joneleit

[11] 3,910,594
[45] Oct. 7, 1975

[54] CONTROL ARRANGEMENT FOR A SUSPENSION SYSTEM USING A PRESSURE MEDIUM

[75] Inventor: Knut Joneleit, Iserlohn, Germany

[73] Assignee: Hoesch Aktiengesellschaft, Dortmund, Germany

[22] Filed: July 19, 1974

[21] Appl. No.: 490,023

Related U.S. Application Data

[62] Division of Ser. No. 254,304, May 17, 1972, Pat. No. 3,830,138.

[52] U.S. Cl. .............. 280/124 F; 91/390; 307/293
[51] Int. Cl.² ....................................... B60G 11/28
[58] Field of Search ........ 280/124 F, 124 R; 91/35, 91/390, 393; 267/65, 114; 307/141.4, 269, 293

[56] References Cited
UNITED STATES PATENTS

| | | |
|---|---|---|
| 3,524,634 | 8/1970 | Schmidt............................ 91/390 X |
| 3,610,611 | 10/1971 | Elliott............................ 280/124 F |
| 3,631,269 | 12/1971 | Monahan........................... 307/293 |

Primary Examiner—Philip Goodman
Attorney, Agent, or Firm—Michael S. Striker

[57] ABSTRACT

Closing of first switches indicates need to raise body of vehicle. Lifting commences after first switches have been closed a predetermined time interval and continues until closure of second switches, which signify need to lower body of vehicle. Lowering commences immediately and is terminated on each side of vehicle when corresponding second switch is again open. If second switch is closed without prior closure of first switches, lowering commences after these switches have been closed the above-mentioned predetermined time interval and stops as above.

17 Claims, 9 Drawing Figures

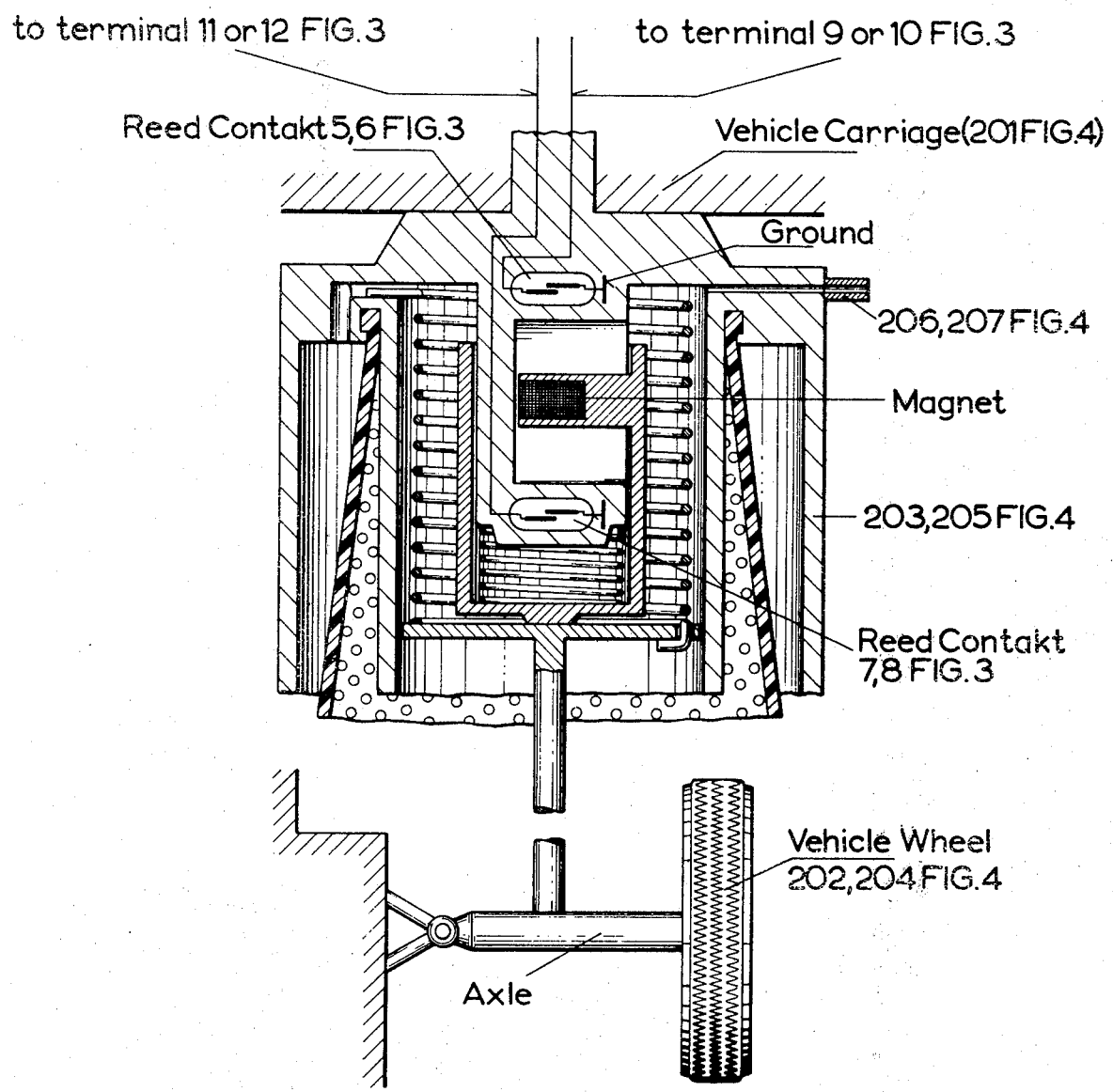

CONTROL ARRANGEMENT FOR A SUSPENSION SYSTEM USING A PRESSURE MEDIUM

This is a division of application Ser. No. 254,304 filed May 17, 1972, now U.S. Pat. No. 3,830,138.

BACKGROUND OF THE INVENTION

This invention relates to control system for regulating the level of a first member with respect to a second member. In particular it relates to such control systems when used in conjunction with a commercial vehicle having a suspension using a pressure medium.

In conventional arrangements of this type, the control system works for a level relative to a single wheel only, has two timing circuits and has a region between the point at which the raising of the body of the vehicle commences and that at which the lowering of the body of the vehicle commences in which no regulation takes place.

This unregulated region is required in order to prevent dynamic oscillations of the vehicle from initiating the control process. One timing circuit of the conventional systems is used to suppress such dynamic oscillations, while the second timing circuit is used for regulation when the vehicle goes around a curve. However, the body of the vehicle does of course assume different positions within the unregulated region depending upon whether the last regulation was a lowering or a raising of the vehicle body.

Loading of the vehicle by the driver of course always initiates a regulating process for lifting the body of the vehicle. In this case then the vehicle body would be lifted until the lowest point of the unregulated zone. Dynamic oscillations when starting will then cause it to sink even further. Thus a second lifting operation may be required.

In addition, if, while the vehicle is being driven, the second timing circuit should fail, then the lifting operation would ensue every time the vehicle goes around a banked curve. Thus the vehicle would be continually changing in level in such a manner that the driver would find it very difficult to control the same. It is even possible that when S curves are being passed by the vehicle that the vehicle might be thrown off the road.

SUMMARY OF THE INVENTION

It is the object of the present invention to furnish a control system which does not have the above-mentioned disadvantages, which is reliable under all possible operating conditions and which operate even when errors or failures appear in the electronic circuitry.

The present invention is a method for adjusting the level of a first member to that of a second member by adjusting the quantity of pressure medium therebetween. It comprises the steps of furnishing a first signal when the distance between said first and said second members is less than a first predetermined distance and furnishing a second signal when the distance between said first and second member is greater than a second predetermined distance. It further comprises delaying said first signal thereby furnishing a delayed first signal and increasing the quantity of said pressure medium in response to said delayed first signal thereby increasing the distance between said first and second members.

The method of the present invention further comprises continuing said increase in quantity of pressure medium until receipt of said second signal and immediately decreasing the quantity of said pressure medium in response to said so received second signal. Said decrease of pressure medium is continued until the cessation of said second signal.

In the event that a second signal is received without prior reception of said first signal, said second signal is delayed thereby furnishing a delayed second signal and the quantity of said pressure medium is decreased in response to said delayed second signal and until cessation of said delayed second signal. It will be noted that in accordance with this method the body of the vehicle, i.e., the first member, always assumes the same position relative to the second member (a wheel axle) regardless of whether the control was originally activated to lift or lower the vehicle.

In a preferred embodiment of the present invention, it is required that for furnishing either the first or the second signal two switches, one on each side of the vehicle, must both close. Thus the control system will never operate while the car is being driven along a curve.

It will also be noted that after an original lifting operation due to the weight of the driver, it is unlikely that any further lifting operations will be initiated because of dynamic oscillations, since the position of the body of the vehicle relative to the axle is such that it is above the switches furnishing the first signals by a distance corresponding to the unregulated region in the previously known arrangements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 9 shows an embodiment of the input switching element.

DESCRIPTION OF THE PREFERRED EMBODIMENTS

Figure 1:
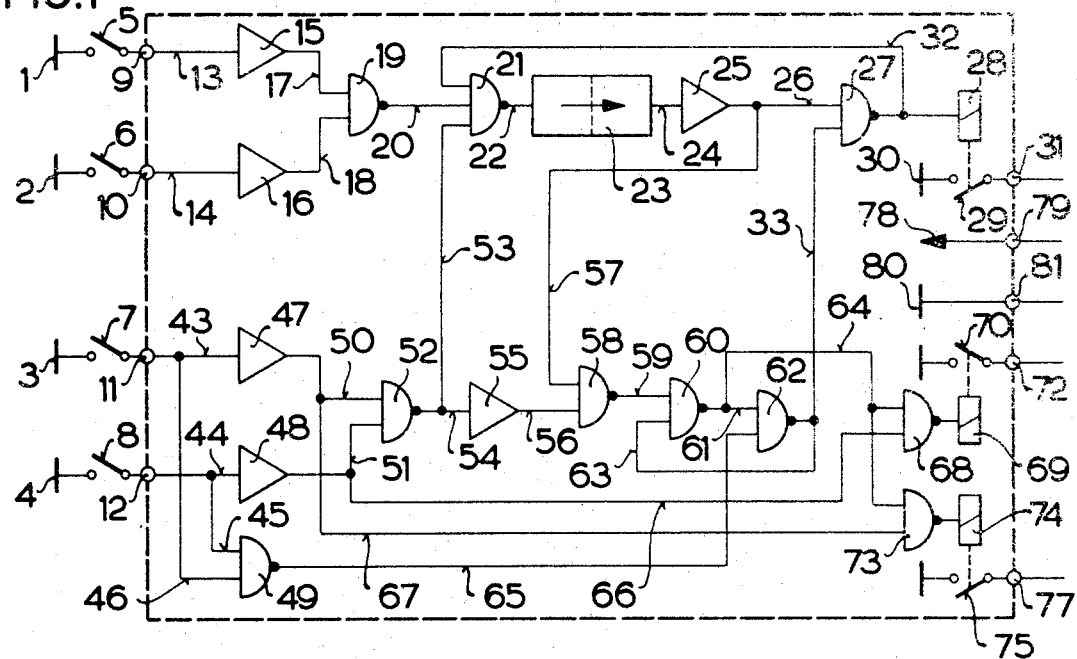
FIG. 1 is a logic circuit diagram of the control system of the present invention.

The preferred embodiment of the present invention will now be described with reference to the drawing.

Before starting the detailed description, some general remarks will be made which apply to the particular preferred embodiment but are not intended to limit the present invention in any fashion.

First the power source for the control arrangement of the present invention is the available electrical power in the vehicle and is positive with respect to ground.

The output units of the present invention are switches which, when closed, initiate a control process. These switches in turn serve to energize relays or electromagnetically controlled valves as illustrated in FIGS. 4–8.

The units furnishing the input signals are also switches. Specifically, a closed switch signifies the need for regulation, while an open switch which disconnects the input terminal from ground signifies the absence of a need for regulation.

Figure 2:
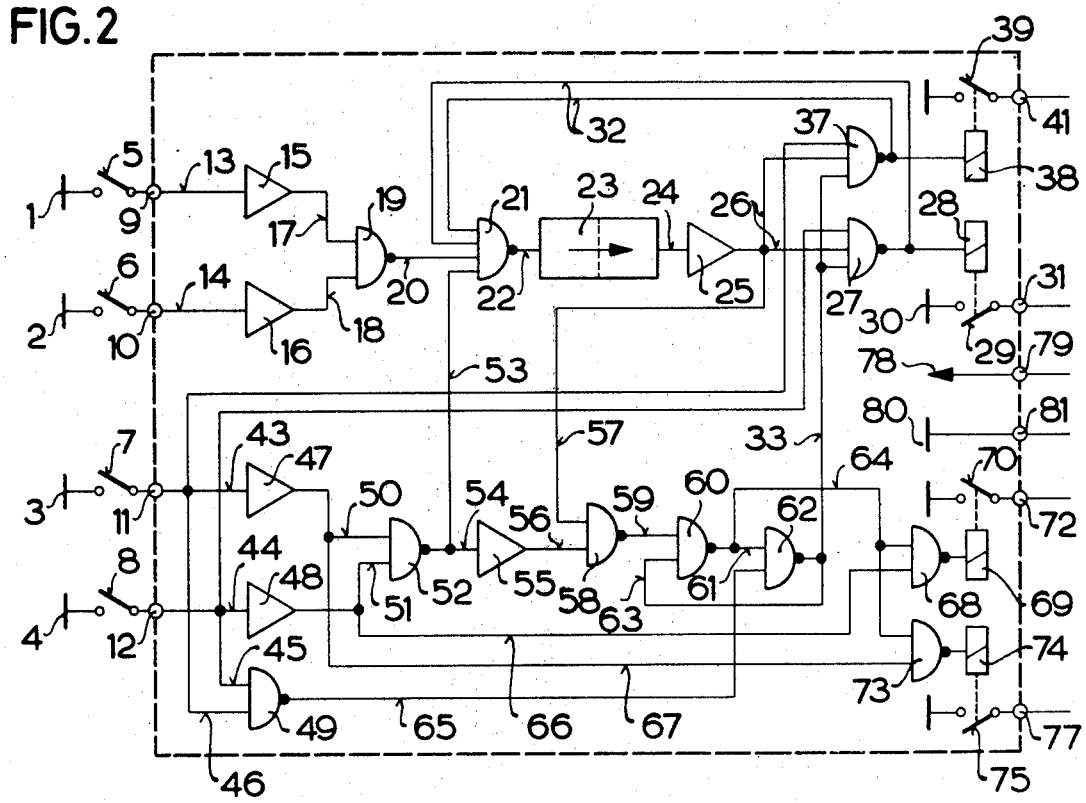
FIG. 2 is a second embodiment of the control system of the present invention.
Figure 3:
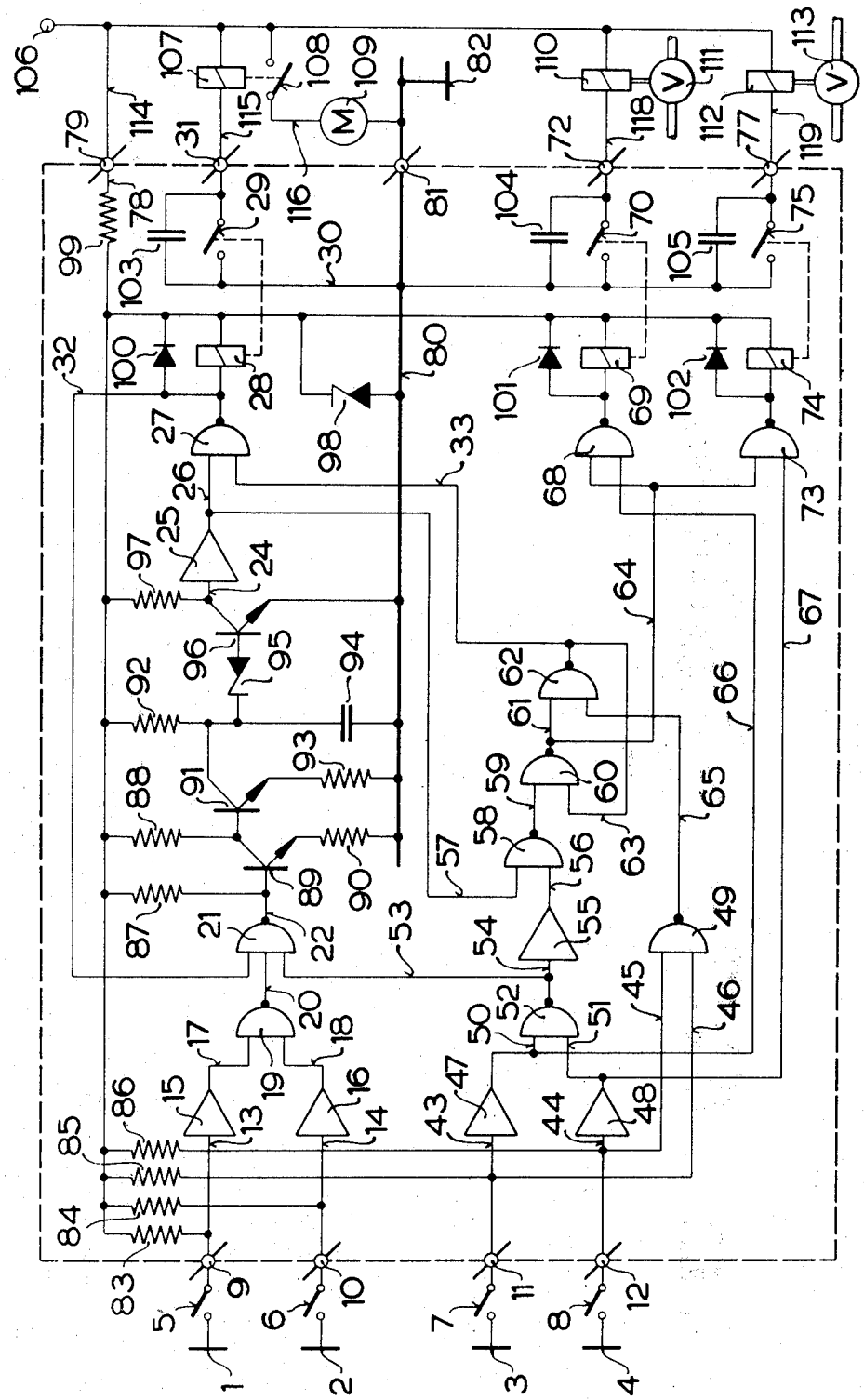
FIG. 3 shows the circuit of FIG. 1 and its connection to the external activating elements for changing the quantity of pressure medium.

In FIGS. 1–3 switches 5 and 7 are assumed to represent the right side of the vehicle, while switches 6 and 8 operate relative to the left wheel. Obviously therefore switches 5 and 7 and 6 and 8 respectively may be opened simultaneously but may not be closed simultaneously. One embodiment of such switches is shown in FIG. 9. Alternatively, the switches may form a part of the hydropneumatic or pneumatic suspension elements.

To Summarize:

Switch 5 closed signifies "lift right side".
Switch 6 closed signifies "lift left side".
Switch 7 closed signifies "lower right side".
Switch 8 closed signifies "lower left side".

The gates indicated in the schematic diagram are commercially available NAND-gate and invertors. A NAND-gate is a gate which gives a low ("L") output only when all inputs are high ("H"). Any other conditions at the inputs will result in a H output. Thus it is possible that the invertors can also be a NAND-gate, all inputs except the input to be inverted being supplied with a high potential. In the specific embodiment of the present invention a low corresponds to ground potential, while a high corresponds to the positive voltage mentioned above which will generally be 12 volts. This voltage is denoted with reference numeral 106 in FIGS. 4–8.

It should also be noted that all pressure control connections when connected to the corresponding activating elements receive the same reference numerals. For example, line 206 is connected with the suspension system for the left wheel.

The actual electronic portion of the control system of the present invention is enclosed in dashed lines in FIGS. 1–3. Points 1–4 as well as point 82 are at ground potential.

Ground lines 80 and 30 are connected to point 82 via a terminal 81 and serve to supply the ground potential wherever needed in the control system.

High voltage is supplied via an external terminal 106 and a line 114 to an input terminal 79. A line 78 then supplies the high potential wherever required.

The electronic portion of the control system has output terminals 31, 41, 72 and 77. The voltage at these points controls the operation of a relay 107, solenoid 110, 112 (FIGS. 3, 4 and 5), further solenoid valves 120 and 122 (FIGS. 6 and 7, respectively) as well as solenoid valves 125 and 127 of FIG. 8.

Further, throughout this presentation invertors are designated by triangles, while the NAND-gates are the remaining gates in the Figures. In the preferred embodiment according to this invention the gates are integrated components, while the timing circuit indicated by 23 in FIGS. 1–3 is built up with discrete components. Specifically, according to FIG. 3, the timing circuit comprises transistors 89, 91 and 96, resistors 87, 88, 90, 92, 93 and 97, as well as the capacitor 94 and a Zener diode 95.

In order to prevent incorrect initiation of regulation due to noise, resistors 83–86 are inserted between the high voltage line 78 and input terminals 9–12 respectively so that a defined voltage appears at the input terminals and thus at the inputs of invertors 15, 16, 47 and 48 when switches 5–8, the input switches, are open.

Further, a resistance 99 in series with a Zener diode 98 is connected between line 78 and ground line 80. The actual high voltage line is taken from a common point of resistor 99 and Zener diode 98 and thus provides a voltage substantially independent of variations in the supply voltage.

Incorporated between the electronic circuitry and the actual elements effecting the flow of the pressure medium, are interposed relay coils 28, 38, 69 and 74 having respective associated contacts 29, 39, 70 and 75. Further a diode 100, 101 and 102 is connected in parallel to each relay coil in order to protect the transistor supplying current to said coils, while the relay contacts are bridged by capacitors 103, 104 and 105 respectively.

The different modes of operation of the circuitry of FIGS. 1–3 will now be described:

When the first member, that is the body of the vehicle, is at the desired distance from the axles, that is when the system has the correct level, switches 5–8 are open resulting in the following circuit conditions:

An H appears at input terminals 9, 10, 11 and 12 and thus on lines 13, 14, 43 and 44. The output of invertors 15 and 16 is thus L causing the output of NAND-gate 19, namely the signal on line 20 to be an H. Similarly, an L appears on lines 50 and 51 causing an H to appear on lines 53 and 54, while the H on lines 45 and 46 causes an L to appear on line 65. The high on line 54 causes a low on line 56. Further, the timing circuit is blocked at this point causing terminal 24 to be high. The H on line 24 results in an L on lines 26 and 57. The L on line 57 in conjunction with the L on line 56 causes the signal on line 59 to be H. Further, the L on line 26 causes the signal on line 32 to be H which, in conjunction with the H on lines 20 and 53 causes the output of gate 21 to be L, blocking the timing circuit. Gate 21 is herein referred to as an input gate for the delay means which comprise gate 21, the timing circuit and output gate 27.

The H on line 59, together with an H on line 63 causes the output of NAND-gate 60 to be L, which in turn causes line 64 to be L, causing the outputs of NAND-gates 68 and 73 to be H. Therefore, both terminals of the windings of relays 28, 69 and 74, as well as relay coil 38 of FIG. 2 are all at equal potential, causing no current to flow through these relays. Thus contacts 29, 39, 70 and 75 remain open and no regulation is effected.

Let us now assume that the vehicle is loaded so that the switches 5 and 6 are closed. This corresponds to the signal to raise both the left and the right side of the body of the vehicle. Terminals 9 and 10 are now at L. Outputs of invertors 15 and 16 are now H, causing the output of NAND-gate 19, appearing on line 20, to change to L. This in turn causes the signal on line 22 to become H, initiating the operation of the timing circuit which will be described below.

Figure 4:
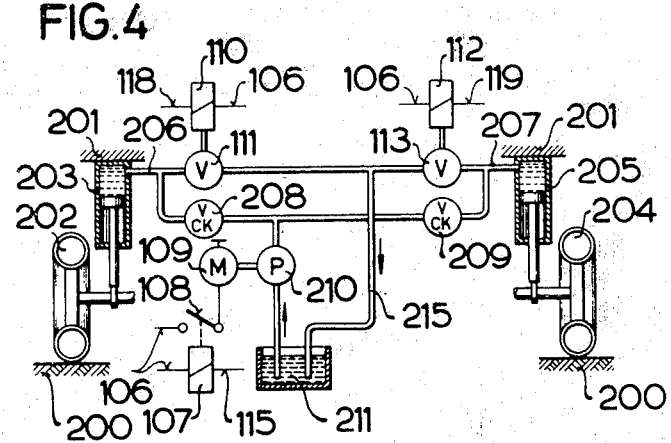
FIG. 4 is a schematic diagram of a hydro- or pneumatic-mechanical arrangement for changing the quantity of pressure medium.
Figure 7:
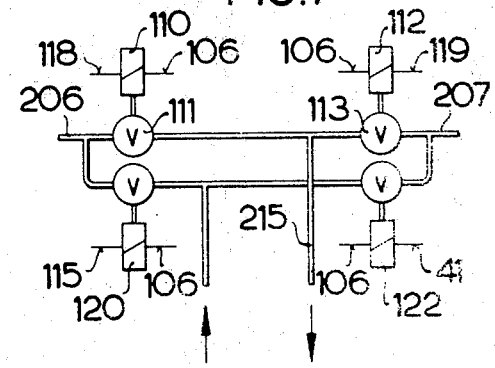
FIG. 7 is a variation of the arrangement of FIG. 4 for connection to the circuitry of FIG. 2.
Figure 5:
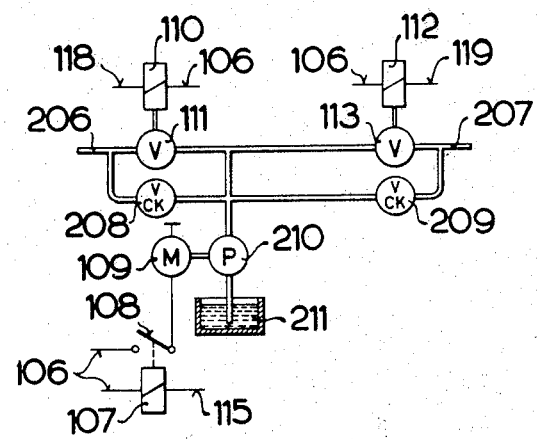
FIG. 5 is a variation of the arrangement of FIG. 4 using a pressure pump having static leakage.

After the predetermined time interval, the H at the output of the timing circuit 23, namely the signal on line 24 changes to L. The output of invertor 25, that is the signal on line 57 is then H. Since the signal on line 33 is still H, the output of NAND-gate 27 changes to L, causing coils 28 to conduct current. Contact 29 therefore closes causing output terminal 31 to be connected to ground potential. As shown in FIG. 3, the end point 115 of the winding of a relay 107 is connected to this output terminal 31, causing relay 107 to be activated which in turn causes its contacts 108 to close energizing the motor 109 (FIGS. 3, 4, 5). Motor 109 in turn drives a pump 210 thereby increasing the quantity of pressure medium in the hydraulic suspension. As shown in FIG. 4, the fluid is pumped from a container 211 via check valves 208 and 209 into lines 206 and 207 which terminate in the suspension elements 203 and 205 (FIG. 4). The increase of fluid causes the body of the vehicle 201 to rise relative to wheels 202 and 204 which are on a roadway 200. The body of the vehicle continues to be lifted until switches 5 and 6 open. At this point, the lifting operation would stop in conventional arrangements of this type.

However, in the circuit shown in FIGS. 1–3, an "L" signal still appears at the output of gate 27 and therefore via line 32, at the input of gate 21. The H output on line 22 is therefore maintained, so that the timing circuit remains in the active state.

It is seen that gate 21, timing circuit 23 including invertor 25 as well as NAND-gate 27 constitute a storage, the stored signal constituting the H signal on line 26.

Thus the body of the vehicle is further lifted until switches 7 and 8 close. This region between switches 5 and 7 on the one hand and 6 and 8 on the other hand prevents excessive regulating processes which may result through dynamic oscillation of the vehicle body. The signal which cancels the stored signal and thus leads to a termination of the pumping process is the signal on line 33 at the input of NAND-gate 27.

Specifically, closing of switches 7 and 8 results in an L signal on lines 43 and 44, these signals signifying that the body of the vehicle is to be lowered. As a result the output of inverter 47 is an H signal which is applied to the input of NAND-gate 52 as well as to the input of NAND-gate 73 via line 67. The H output appearing at the output of inverter 48 is applied to the second input of NAND-gate 52 via line 51 and to one input of NAND-gate 68 via line 66. It should be noted that NAND-gate 62 is referred to herein as third gating means, while NAND-gate 58 is referred to as fourth gating means and NAND-gates 68 and 73 are fifth gating means. The output of NAND-gate 52 thus changes to L. This L at the input of inverter 55 causes its output on line 56 to be H. This H signal is applied to one input of NAND-gate 58 which is still receiving a second H signal via line 57. The output of NAND-gate 58 therefore changes to L. The L signal on line 59 is applied to one input of NAND-gate 60, causing the output of NAND-gate 60 to be H. This H signal is applied to one input of NAND-gate 62. It is further applied to one input of NAND-gates 68 and 73.

NAND-gates 68 and 73 now have two H signals applied at their inputs, causing the outputs to switch to L. Coils 69 and 74 thus draw current and contacts 70 and 75 close. Now output terminals 72 and 77 are connected to ground. As shown in FIG. 3, this causes the coil of a solenoid valve 110 which is connected to output terminal 72 via a line 116 to draw current, causing the associated valve 111 to open. The pressure medium previously pumped by pump 210 now returns via a return pipe 215 into container 211. No. fluid can enter the suspension element 203 at this point.

In addition, the line 119 which is connected to one terminal of a second solenoid valve 112 is also connected to ground potential, causing the solenoid valve 112 to be activated, opening its valve element 113. This causes fluid from the suspension element 205 to be returned to container 211 via line 215 and prevents further fluid from entering element 205.

At the same time at which the output of NAND-gates 68 and 73 switches to L, the same process takes place at the output of NAND-gate 62, since its first input as H as derived from NAND-gate 48 over line 65, and the second input is also H and is applied as previously described via line 61. Gates 60 and 62, together with the feedback line 63 constitute a storage for use during the lowering control process. In this particular case the L signal is stored at the output of gate 62. Since this L signal is applied via line 33 to one input of NAND-gate 27, the output of said NAND-gate switches from L to H, which causes the current flow through coil 28 to be blocked and and contacts 29 to open. This causes the pumping process to be stopped.

Opening of valves 11 and 113 causes the body of the vehicle to be lowered. This process continues until switches 7 and 8 are again open.

This is accomplished as follows:

The stored signal namely the H output at the output of inverter 25 still maintains via line 23 NAND-gat 21 and line 53. If now for example switch 7 opens first, the L signal on terminal 11 changes to H causing the signal on line 50 to become L. The output of NAND-gate 52 therefore changes to H, causing NAND-gate 22 to have an L output thereby resetting the timing circuit. Therefore, as will be described below, the L signal on line 27 and the H signal of line 57 are reversed. NAND-gate 58 now has an L input applied via line 57 and also via line 56. Its output on line 59 thus changes to H.

However, the signal on line 61 is maintained, since NAND-gate 49 still supplies an H signal via line 65 to one input of NAND-gate 62. However, the change from H to L at the output of inverter 47 is applied via line 67 to one input of NAND-gate 73. The output of NAND-gate 73 therefore changes to H, causing coil 74 to be deenergized and contact 75 to open.

This causes the solenoid valve 112 to close, causing the lowering process to be stopped on one side of the vehicle.

However, the other side of the vehicle continues to be lowered until switch 8 also opens. This causes the H signal on line 66 to be changed to L, causing solenoid valve 110 to close. Further, the output of NAND-gate 49 also changes, causing an L signal to be applied to one input of NAND-gate 62 via line 65. This causes the signals on lines 61 and 62 to return to their original value also, causing the regulating process to be terminated. The body of the vehicle is now at the desired level.

It will now be assumed that the vehicle is unloaded, causing switches 7 and 8 to close. This generates the signals resulting in a lowering of the carriage of the vehicle on both the right and the left sides. Specifically, input terminals 11 and 12 are at ground potential. One input of NAND-gate 52 receives an H signal via line 43, inverter 47 and line 50. The H signal is also applied via line 67 to NAND-gate 73. The second input of NAND-gate 52 also receives an H signal, namely via line 44, inverter 48 and line 51. This signal is also applied via line 66 to the input of NAND-gate 68. An H input is further applied to NAND-gate 62 via lines 45 and 46, NAND-gate 49 and line 65. The output of NAND-gate 52 thus becomes L. This signal is applied via line 54 to inverter 55, which in turn furnishes an H signal via line 56 to the input of NAND-gate 58. The H signal supplied by NAND-gate 52 is also applied via line 53 to one input of NAND-gate 21. The output of NAND-gate 21 changes, causing the timing circuit to be energized. At the end of the time period the output of the inverter 25 supplies an H signal to an input of NAND-gate 58. The output of NAND-gate 58 thereby changes to L, thereby setting the storage comprising NAND-gate 60 and NAND-gate 62 as explained above. The termination of the vehicle lowering process is identical to that as was described following the end of the elevating or raising process above.

Thus the use of a single timing circuit 23 permits a vehicle body which is at a particular level to be raised after a predetermined time interval until both switches signifying the need for a lowering of the vehicle body are closed and thereafter to immediately initiate the lowering process. Further, if the signals indicating that a lowering of the vehicle is desired occur without previous occurrence of the signals requiring a raising of the vehicle body, the lowering process start only a predetermined time interval after receipt of the corresponding signals.

The time delay can be achieved either with a timing circuit 23 which uses an RC combination or else with delay lines or purely digitally with a counter.

The timing circuit of FIG. 3 will now be described in more detail. Specifically, the timing circuit comprises a transistor 91 which is a switching transistor and which is fully conductive when the level of the vehicle is the desired level. A resistance 93 is connected between the emitter of transistor 91 and ground potential. The emitter-collector circuit of transistor 91 and the resistor 93 are connected in parallel with capacitor 94 which is the timing capacitor. When transistor 91 is fully conductive the upper terminal of capacitor 94, namely the terminal not connected to ground potential is also substantially at ground potential.

Resistor 87 shown at the output of NAND-gate 21 and connected to the base of a transistor 89 is actually the collector resistance at the output of sand NAND-gate. Resistors 88, 90 and transistor 89 together form an inverter.

If now an H signal is applied via line 22 to the base of transistor 89, this causes transistor 89 to become conductive in turn causing transistor 91 to be blocked. With transistor 91 blocked, capacitor 94 charges through resistance 92. Zener diode 95 together with the base-emitter circuit of transistor 96 constitute a threshold, which determines at which point transistor 96 becomes conductive. When transistor 96 becomes conductive, a large voltage drop appears across its collector resistance 97, causing the signal on line 24 to change from H to L. This signifies the end of the predetermined time interval.

The circuit of FIG. 2 differs from that of FIG. 1 in that an additional NAND-gate 37 is provided which serves to energize an additional relay having a coil 38 and associated contact 39. when contact 39 is closed, output terminal 41 is connected to ground potential so that a further solenoid valve 122 (FIG. 7) can be activated. The combination of the circuitry of FIGS. 2 and 7 allows the addition of a pressure medium to be stopped individually on each side of the vehicle during the elevating or lifting process.

It should further be noted with respect to FIG. 5, that this presents a possible arrangement for saving one pipe relative to the arrangement of FIG. 4. Hydraulic pumps exist which are not liquid tight under standstill conditions, that is the oil can return through the pump. In FIG. 4, when the vehicle is being lowered, the oil must return via line 215 into the container 211. In FIG. 5 this oil return takes place via pump 210. Thus if pump 210 is located in the front of the vehicle while the regulating elements 203 and 205 are located near the rear axle, then two hydraulic pipes are necessitated in FIG. 4, namely from pump 210 to valves 208, 209 and the pipe 215.

Figure 6:
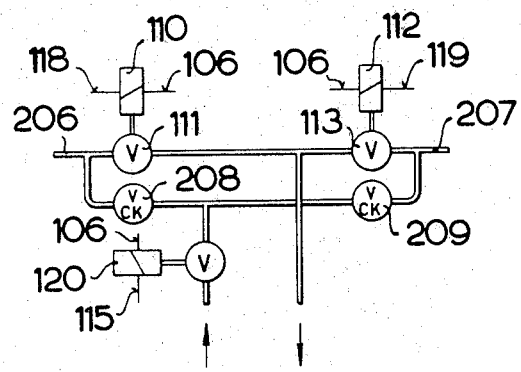
FIG. 6 is a variation of the embodiment of FIG. 4 for connection to a central source of pressure medium.

FIG. 6 shows essentially the same arrangement as FIG. 4, except that valve 120 replaces a pump 210 and motor 109. This arrangement may be used for motor vehicle having a central hydraulic system.

Figure 8:
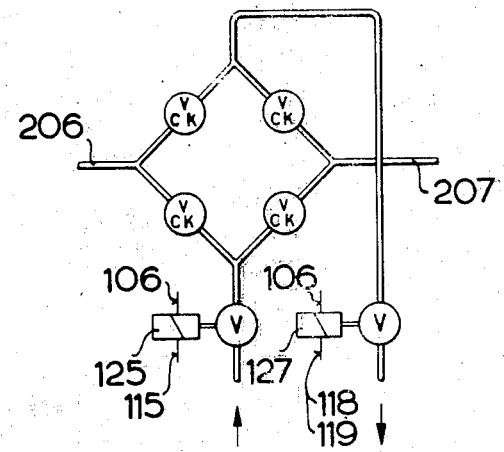
FIG. 8 is a variation of the arrangment of FIG. 4 for connection to the circuitry of FIG. 1.

In the arrangement in accordance with FIG. 8, one end of the winding of solenoid valve 127 is connected via lines 118 and 119 simultaneously to both terminals 72 and 77 of the control circuit.

By this it will be possible with only one solenoid valve to effect a lowering of both sides of the motor vehicle.

It should further be noted that the circuitry according to FIGS. 1, 2 and 3 is safe if an inadvertent short circuit is applied at output terminals 31, 72 and 77. Reference to FIG. 3 shows clearly that contacts 29, 70 and 75 cannot be damaged by such an inadvertent short circuit. If the connections to relays 107, 110 and 112 were reversed, that is if the connections through the contacts were made to the high side of the supply rather than to ground, such inadvertent short circuits would result in damage to the contacts. This of course is not true in the embodiment shown in FIGS. 1–3.

FIG. 9 shows one possible embodiment of switches 5 or 6 and 7 or 8. Of course on each side of the vehicle the same arrangement would be used. It will be noted that Reed contacts are connected rigidly to the vehicle axle, while a magnet which is mounted on the body of the vehicle moves relative to said contacts. If the body sinks too low on a particular side, contact 7 is for example closed. Similarly if the magnet rides too high, contact 5 may for example be closed. How the closing of these contacts effects the control circuitry of FIGS. 1–3 has been discussed in detail above.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a system including a body of a motor vehicle, an axle of said motor vehicle, and suspension means for suspending said body relative to said axle at a distance varying at least in part as a function of pressure medium in said suspension means, in combination, first signal furnishing means for furnishing a first signal when the distance between said body and said axle is less than a first predetermined distance; delay means connected to said first signal furnishing means, said delay means having input gating means including at least one bistable semiconductor logic circuit, timing circuit means connected to said input gating means for furnishing a predetermined time delay, and output gating means connected to said timing circuit means, said output gating means furnishing a first activating signal after said predetermined time delay following receipt of said first signal; and first activating means connected to said delay means for changing the quantity of said pressure medium in such a manner as to increase said distance between said body and said axle, in response to said first activating signal.

2. In a system including a body of motor vehicles, an axle of said motor vehicle, and suspension means for suspending said body relative to said axle at a distance varying at least in part as a function of pressure medium in said suspension means, in combination, first signal furnishing means for furnishing a first signal when the distance between said body and said axle is less than a first predetermined distance; delay means connected to said first signal furnishing means, said delay means having input gating means, timing circuit means connected to said input gating means for furnishing a predetermined time delay, and output gating means connected to said timing circuit means, said output gating means furnishing a first activating signal after said predetermined time delay following receipt of said first signal; first activating means connected to said delay means for changing the quantity of said pressure medium in such a manner as to increase said distance between said body and said axle, in response to said first activating signal; second signal furnishing means for furnishing a second signal when the distance between said body and said axle is greater than a second predetermined distance; and third gating means interconnected between said second signal furnishing means and said output gating means for inhibiting the furnishing of said first activating signal in response to said second signal, thereby deactivating said first activating means.

3. A system as set forth in claim 2, wherein said delay means further comprise first storage means connected to the output of said timing circuit means for storing said first signal following said predetermined time delay, thereby furnishing a stored first signal; and fourth gating means, having a first and second input respectively connected to said second signal furnishing means and said first storage means, for furnishing a second activating signal in response to said second signal and said stored first signal; and second activating means for changing the quantity of said pressure medium in such a manner as to decrease the distance between said body and said axle, in response to said second activating signal.

4. A system as set forth in claim 3, further comprising means interconnecting said second signal furnishing means and said first storage means in such a manner that said first storage means also furnish said stored signal after said predetermined time delay following receipt of said second signal, whereby said fourth gating means furnish said second activating signal also in the absence of said second signal and following said predetermined time delay after receipt of said second signal.

5. A system as set forth in claim 4, wherein said control system has a first and second input terminal; and wherein said first and second signal furnishing means comprise, respectively first and second switch means, each having an open and a closed state, said first and second switch means respectively connecting said first and second input terminal to ground potential when in said closed state.

6. A system as set forth in claim 5, wherein said timing circuit means comprise resistor-capacitor timing circuit means.

7. A control system as set forth in claim 6, wherein said timing circuit means further comprise timing switch means connected to said capacitor, for switching from a first to a second state when the voltage across said capacitor exceeds a predetermined voltage.

8. A control system as set forth in claim 7, wherein said timing switch means comprise timing transistor means having a base connected to said capacitor and having an emitter-collector circuit changing from a non-conductive to a conductive state when the voltage across said capacitor exceeds said predetermined voltage.

9. A control system as set forth in claim 8, further comprising Zener diode means connected between said base of said timing transistor means and said capacitor.

10. A control system as set forth in claim 8, wherein said output gating means comprise output NAND-gate means having a first input connected to said emitter-collector circuit of said timing transistor means, a second input connected to the output of said third gating means and an output connected to said first activating means.

11. A control system as set forth in claim 10, wherein said input gating means comprise input gating transistor means short circuiting said capacitor until receipt of a start signal, and input NAND-gate means furnishing said start signal in response to said first or said second signal.

12. A control system as set forth in claim 11, wherein said first storage means comprise means connecting said output of said output NAND-gate means to an input of said input NAND-gate means, thereby maintaining said timing transistor means in said conductive state.

13. A system as set forth in claim 1, wherein said control means has a first output terminal; wherein said first activating means comprise first relay means having a pair of normally open contacts connected to said first output terminal and to ground potential, for connecting said first output terminal to said ground potential in response to said first activating signal; and wherein said first activating means further comprise pump means operative when said first output terminal is connected to said ground potential.

14. A system as set forth in claim 13, wherein said control system further comprises a second output terminal; and wherein said second activating means comprise second relay means having a pair of normally open contacts connected between said second output terminal and ground potential, said second activating means further comprising valve means decreasing the quantity of said pressure medium when said second output terminal is connected to said ground potential, whereby inadvertent short circuiting of said first or said second output terminal to said ground potential cannot damage said contacts of said first or second relay means.

15. A system as set forth in claim 14, wherein said vehicle has a right side and a left side; wherein said second signal furnishing means comprise right and left second signal furnishing means responsive, respectively, to the distance between said body of said vehicle to said axle on said right and said left side; further comprisng fifth and sixth gating means each having a first input connected to the output of said fourth gating means, said fifth and sixth gating means having a second input respectively connected to said right and left second signal furnishing means, said fifth and sixth gating means having respective outputs furnishing a right and left second activating signal, said second activating means comprising right and left second activating means respectively responsive to said right and left second activating signal.

16. In a motor vehicle having a hydraulic suspension system, a method for adjusting the level of the body of said motor vehicle relative to at least one axle thereof, comprising, in combination, the steps of furnishing a first signal when the distance between said body of said vehicle and said axle is less than a first predetermined distance; furnishing a second signal when the distance between said body of said vehicle and said axle is greater than a second predetermined distance; delaying said first signal thereby furnishing a delayed first signal; storing said delayed first signal thereby furnishing a stored signal; changing the quantity of said pressure medium in response to said stored signal in such a manner that the distance between said body of said vehicle and said axle increases; reversing said change in said pressure medium substantially immediately upon receipt of said second signal; and terminating said change in said pressure medium upon termination of said second signal.

17. A method as set forth in claim 16, further comprising the steps of delaying said second signal in the absence of said stored signal, thereby furnishing a delayed second signal; and changing the quantity of said pressure medium in response to said delayed second signal in such a manner that the distance between said body of said vehicle and said axle decreases.

\* \* \* \* \*